(12) United States Patent
Mitchell (10) Patent No.: US 7,752,727 B2
(45) Date of Patent: Jul. 13, 2010

(54) HOLDING DEVICE

(75) Inventor: David Mitchell, Carina Heights (AU)

(73) Assignee: Private Brand Tools (Australia) Pty Ltd, Darra, Queensland (AU)

( * ) Notice: Subject to any disclaimer, the term of this patent is extended or adjusted under 35 U.S.C. 154(b) by 0 days.

(21) Appl. No.: 11/634,252

(22) Filed: Dec. 6, 2006

(65) Prior Publication Data
US 2008/0135717 A1    Jun. 12, 2008

(51) Int. Cl.
*B25B 27/14* (2006.01)
(52) U.S. Cl. ............................ 29/281.5; 29/239; 29/271
(58) Field of Classification Search .............. 29/281.1, 29/281.5, 281.6, 239, 271, 270, 283, 259, 29/263, 266; 259/98 R, 100; 269/249, 143, 269/265, 268, 91–94
See application file for complete search history.

(56) References Cited

U.S. PATENT DOCUMENTS 2,305,995 A * 12/1942 Roberts ........................ 29/239
5,606,788 A * 3/1997 Rubino et al. ................. 29/259
7,047,610 B2 * 5/2006 Dawson ...................... 29/281.1
2006/0016058 A1   1/2006 Wu
2008/0135717 A1 * 6/2008 Mitchell ..................... 248/680

FOREIGN PATENT DOCUMENTS

GB    2 381 563    5/2003
GB    2 392 711    3/2004

OTHER PUBLICATIONS

British Search Report dated Mar. 10, 2008.

* cited by examiner

*Primary Examiner*—Lee D Wilson
(74) *Attorney, Agent, or Firm*—Nixon & Vanderhye P.C.

(57) ABSTRACT

A holding device (1) for holding a gear (60) stationary relative to an engine block. The device (1) includes a body (2) having a threaded passage extending axially therethrough, a projection (4) extending laterally of the body (2) and adapted to engage a recess (63) between teeth (62) of the gear (60), a hooked portion (3) adapted to (i) extend between the gear (60) and the engine block and (ii) hook behind the teeth (62) of the gear (60), and a jacking screw (5) extending through the threaded passage and rotatable relative to the body (2) such that an end (53) of the jacking screw (5) engages the engine block and moves the hooked portion (3) into firm engagement with the gear (60).

10 Claims, 8 Drawing Sheets

HOLDING DEVICE

FIELD OF THE INVENTION

This invention relates to a holding device for holding a gear of an engine stationary relative to another part of the engine, such as the engine block or cylinder head.

BACKGROUND OF THE INVENTION

For internal combustion engines, timing belts are trained around gears (also known as sprockets, toothed pulleys and rotary elements) that are mounted to ends of cam shafts. Such belts require periodic replacement. To ensure that the timing relationship between the cam shafts and crank shaft of the engine is not lost, the cam shafts may need to be held against rotation whilst the belt is removed and a new timing belt is fitted.

Tools for effecting such immobilization of cam shafts are available. Often such tools are specifically designed for a particular type of engine and are not usable for other engines. This requires a selection of tools to be stocked in order to enable workshops to perform replacement of timing belts for a variety of different engines types.

U.S. Pat. No. 7,047,610 discloses a clamping device for holding a rotary element (hereafter "gear") stationary relative to a fixed body. The clamping device has a first knob for moving a pair of clamping elements towards one another and into clamping engagement with opposing radial faces of the gear. The clamping device also has a second knob for rotating a jacking screw into engagement with the fixed body such that the gear is urged away from the fixed body.

Although the clamping device of U.S. Pat. No. 7,047,610 may be used for different types of gears, it has disadvantages in that it is of a particularly complex construction and is tedious to operate. The latter becomes more of a problem when the device needs to be used with an engine where there is little clearance between the gear and other parts of the engine.

SUMMARY OF THE INVENTION

It is an object of the present invention to provide a holding device which at least minimises one or more of the disadvantages mentioned above.

According to the present invention, there is provided a holding device for holding a gear of an engine stationary relative to another part of the engine, said device comprising:
  a body having an upper end and a lower end, and a threaded passage extending between the ends;
  a projection extending laterally of the body and adapted to engage one or more teeth of the gear;
  a hooked portion extending from the lower end of the body and adapted to (i) extend between the gear and the other part of the engine, and (ii) hook behind the teeth of the gear; and
  a jacking screw extending through the passage and rotatable relative to the body such that an end of the jacking screw engages the other part of the engine and moves the hooked portion into engagement with the gear.

The body may be of any suitable size, shape and construction, and may be made of any suitable material or materials. Preferably, the body is substantially cylindrical, it has an axis and the threaded passage extends along the axis.

The body may be of unitary construction or may comprise two or more detachably connected pieces. The threaded passage may be provided by a removable insert of the body. Preferably, the body has an outer shell having a bore and a block having the threaded passage is insertable within the bore. Preferably, the block is non-cylindrical, eg. a hexagonal prism, such that the insert cannot rotate within the bore whilst the jacking screw is being rotated.

The hooked portion may be of any suitable size, shape and construction, and may be made of any suitable material or materials. Preferably, the hooked portion comprises a flange extending perpendicularly of the body and an upturned end for hooking behind the teeth. The flange may be a plate and the upturned end may be an upstanding wall extending along a width of the plate. The wall may be substantially linear, corrugated/undulating and/or arcuate. The wall preferably engages an inner face of a circumferentially extending toothed rim of the gear. Preferably, the wall is substantially linear and each end of the wall is chamfered, and the ends engage the inner face of the rim.

The (outer shell of the) body and hooked portion may be of unitary construction or may be detachably connected to one another (eg. a tongue and groove arrangement).

The projection may be of any suitable size, shape and construction, and may be made of any suitable material or materials. The projection may engage the tooth or teeth in any suitable way. For instance, the projection may be forked and may extend each side of a tooth. Alternatively, the projection may be adapted to extend within a recess between adjacent teeth. Preferably, the projection is substantially in the shape of a half cylinder and a longitudinal axis of the cylinder extends parallel with the axis of the body.

The (outer shell of the) body and projection may be of unitary construction or may be detachably connected to one another (eg. a tongue and groove arrangement). The device may have more than one projection extending laterally of the body for engaging one or more teeth of the gear.

The jacking screw may be of any suitable size, shape and construction, and may be made of any suitable material or materials. Preferably, the jacking screw has an upper end and a lower end. A knob may be located at the upper end and a threaded shank may extend therefrom. Preferably, the end of the jacking screw that engages the other part of the engine is pointed such that the jacking screw will not walk off centre when being rotated relative to the body. The threaded shank may comprise two or more attachable pieces, such that the length of the jacking screw may be lengthened or shortened as required. A threaded shank extension piece may be attachable to the pointed end so as to increase the overall length of the jacking screw.

Preferably, the body (outer shell thereof), projection and hooked portion are of unitary construction and are made of plastics material or metal. Preferably, the knob of the jacking screw is made of plastics material and the threaded shank is made of metal.

The other part of the engine will typically be the engine block or cylinder head.

Preferred embodiments of the invention will now be described with reference to the accompanying drawings.

DESCRIPTION OF THE PREFERRED EMBODIMENTS

In the figures, like reference numerals refer to like features.

FIGS. 1-8 show a holding device 1 for holding a gear 60, 70 of an engine stationary relative to another part of the engine. The holding device 1 comprises a body 2, a hooked portion 3, a projection 4 and a jacking screw 5.

Figure 1:
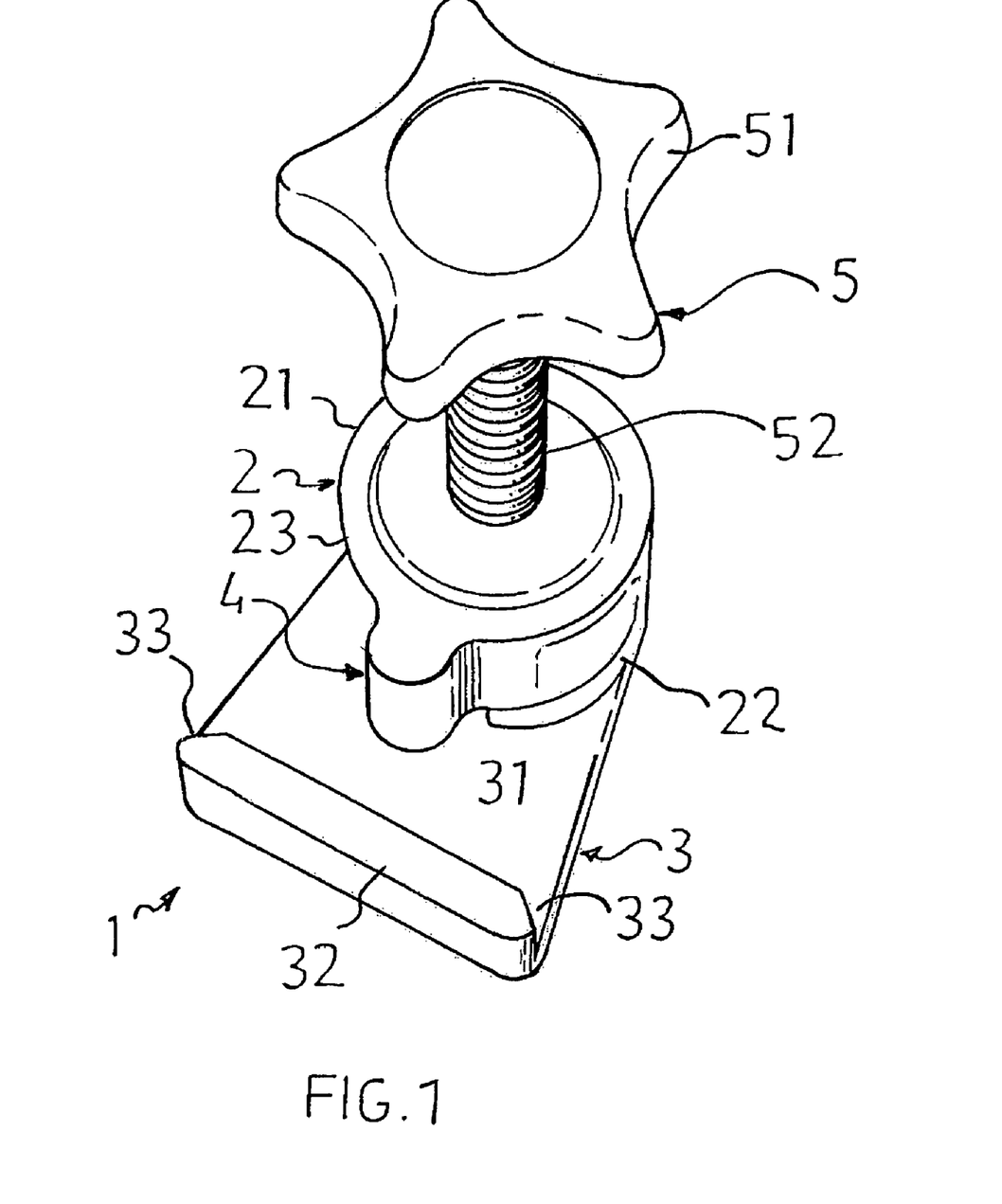
FIG. 1 is a perspective view of a holding device, according to an embodiment of the present invention.
Figure 2:
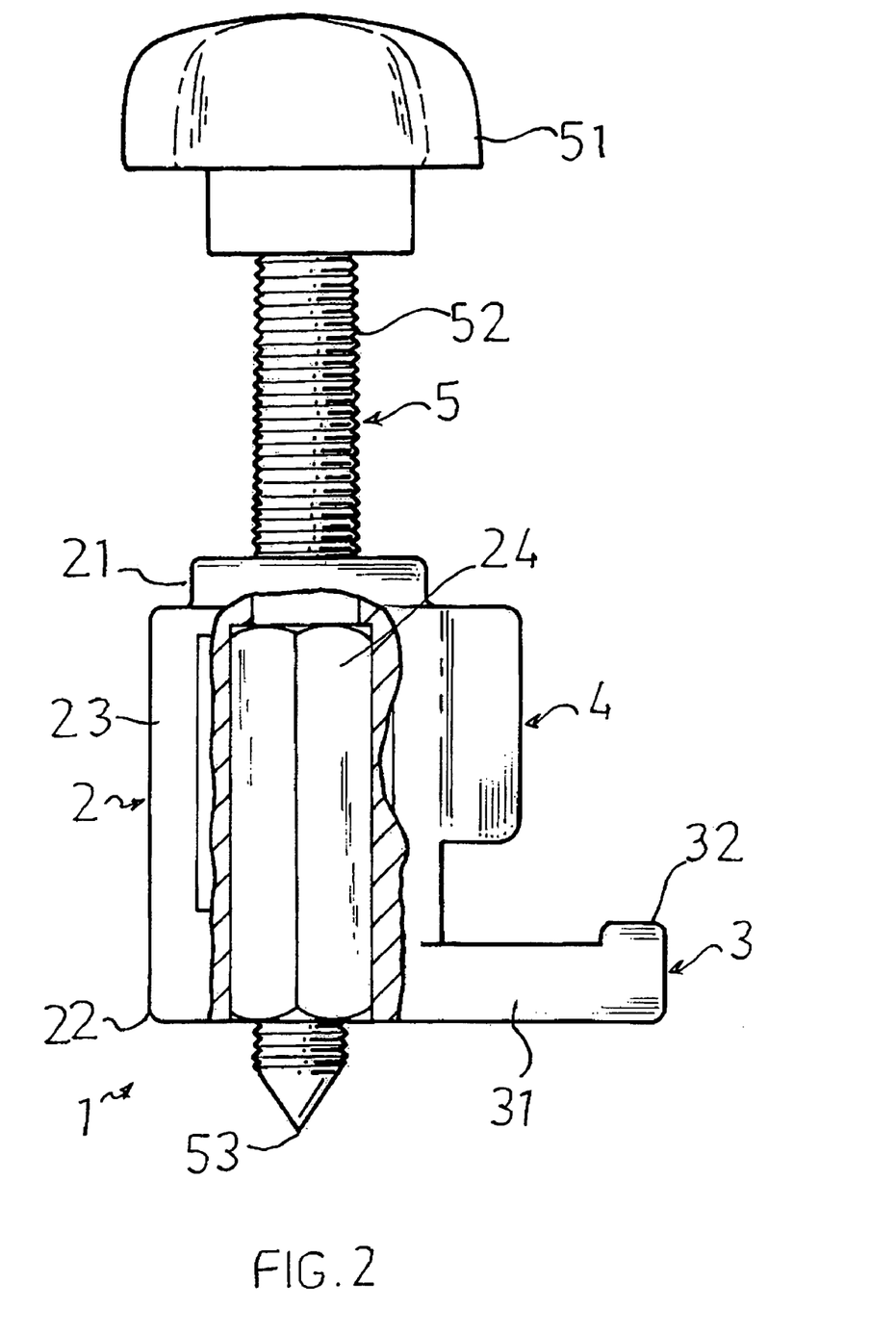
FIG. 2 is a side elevation cut-away view of the holding device shown in FIG. 1.

The body 2 is substantially cylindrical, it has an upper end 21, a lower end 22 and an axially extending threaded passage (not labeled). The upper 21 and lower 22 ends are labeled in FIGS. 1 and 2. The upper end 21 has a stepped periphery, as seen in FIG. 2.

Figure 3:
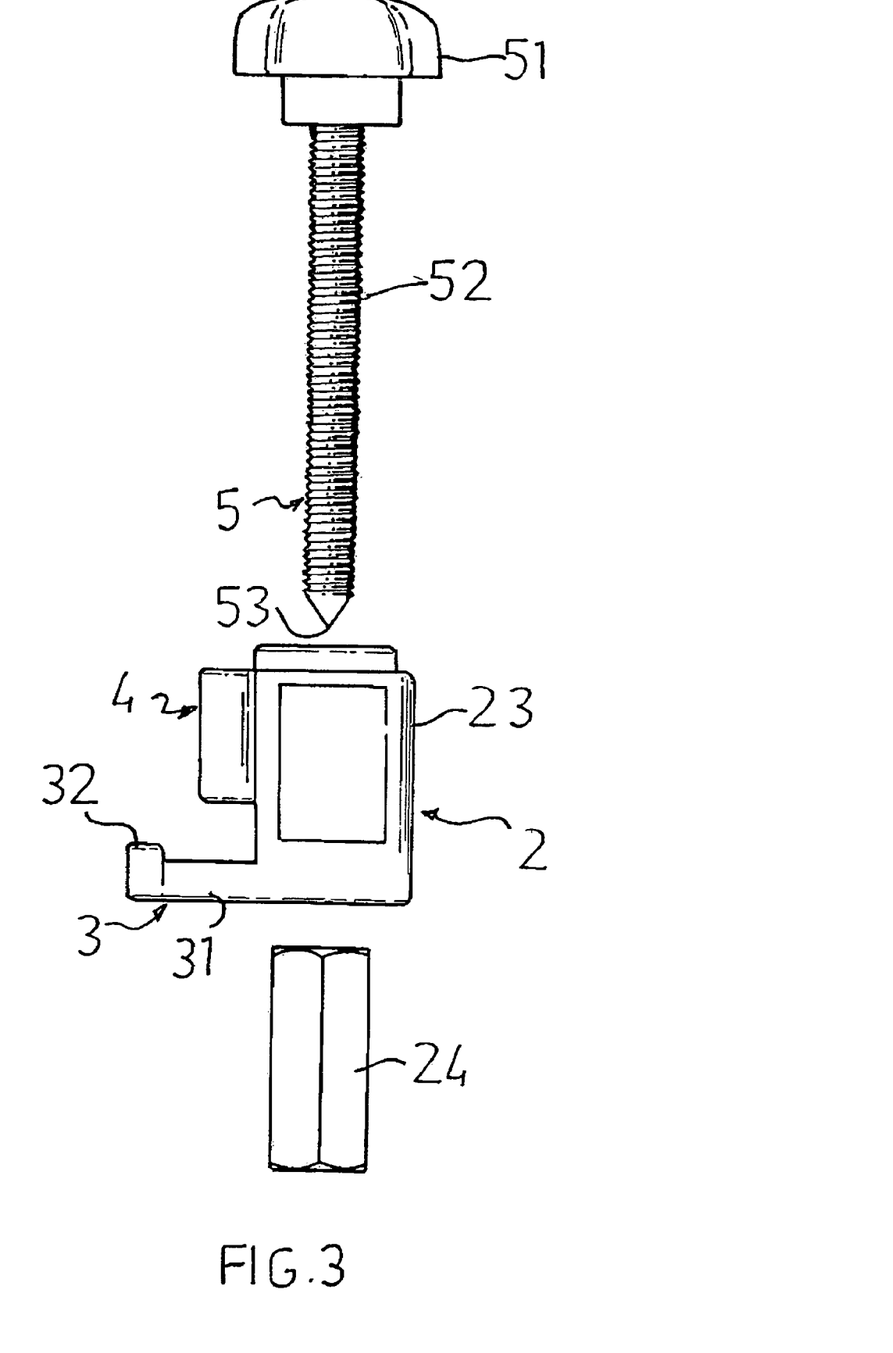
FIG. 3 is a side elevation exploded view of the holding device shown in FIG. 1.
Figure 7:
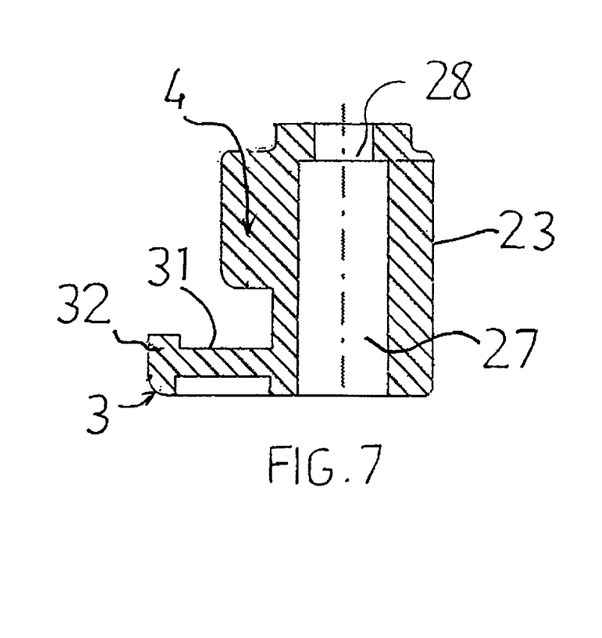
FIG. 7 is a cross-sectional view of FIG. 6, taken through plane X-X.

The body 2 comprises an outer shell 23 having an axially extending (unthreaded) bore 27, 28 (as shown in FIG. 7) and a hexagonal insert 24 (as shown in FIG. 3) that friction fits within the bore 27. The threaded passage extends along a longitudinal axis of the hexagonal insert 24.

Figure 5:
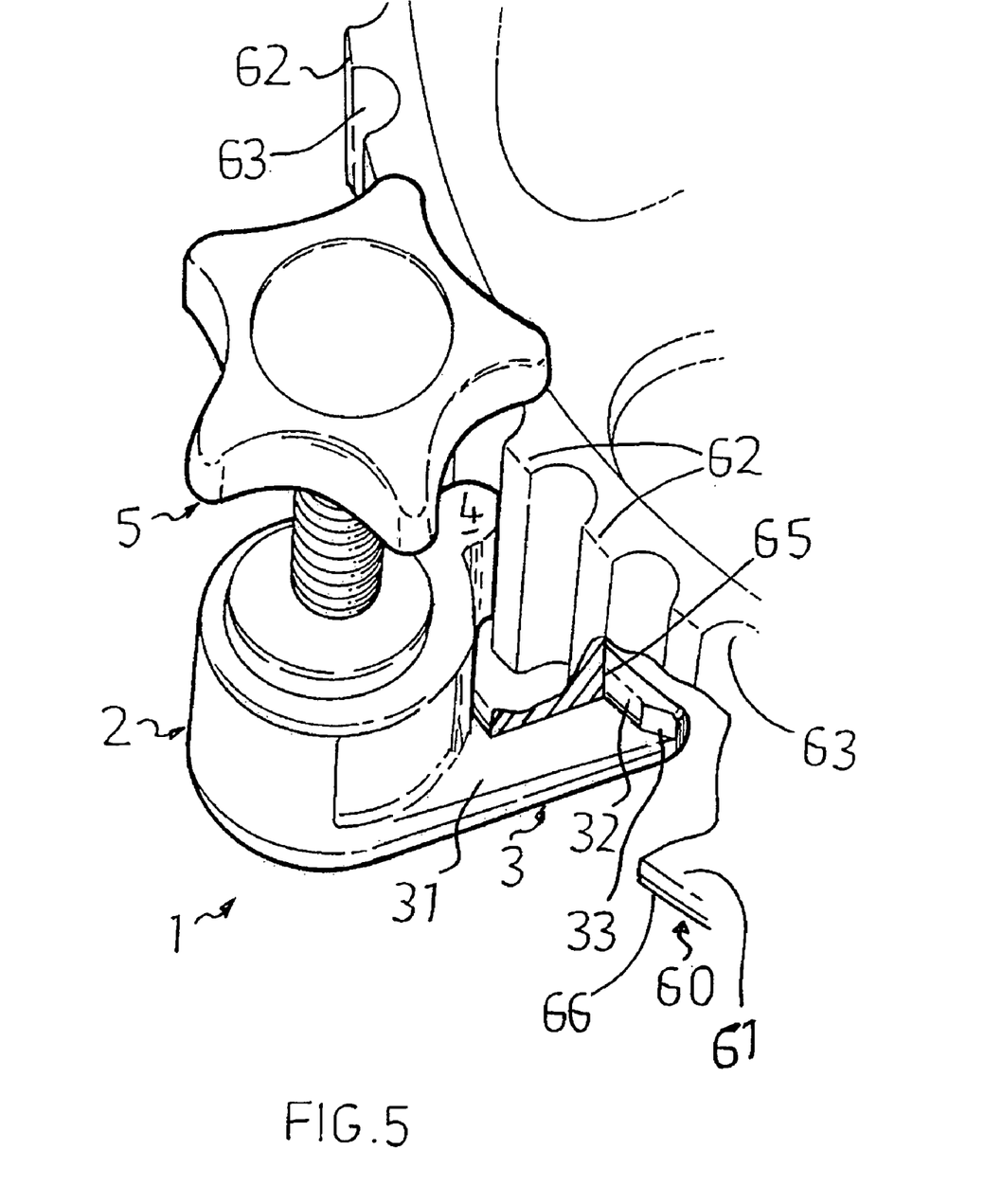
FIG. 5 is a cut-away view of FIG. 4.
Figure 6:
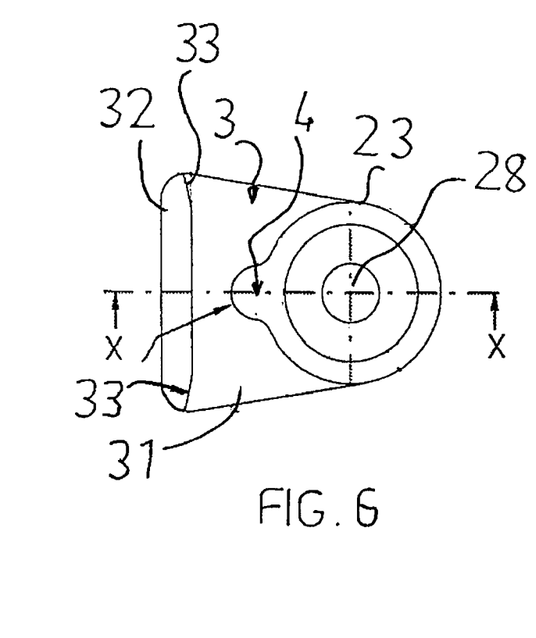
FIG. 6 is a top plan view of part of the holding device shown in FIG. 1.

The hooked portion 3 extends laterally of the lower end 22 of the body 2. A flange plate 31 of the hooked portion 3 is extendible between the gear 60, 70 and the engine block. An upstanding wall 32 of the hooked portion 3 is adapted to hook behind teeth 62, 72 of the gear 60, 70. The wall 32 extends along a width of the flange plate 31. As seen in FIGS. 1, 5 and 6, the wall 32 is substantially linear but has chamfered ends 33 which are in contact with the gear 60, 70.

Figure 4:
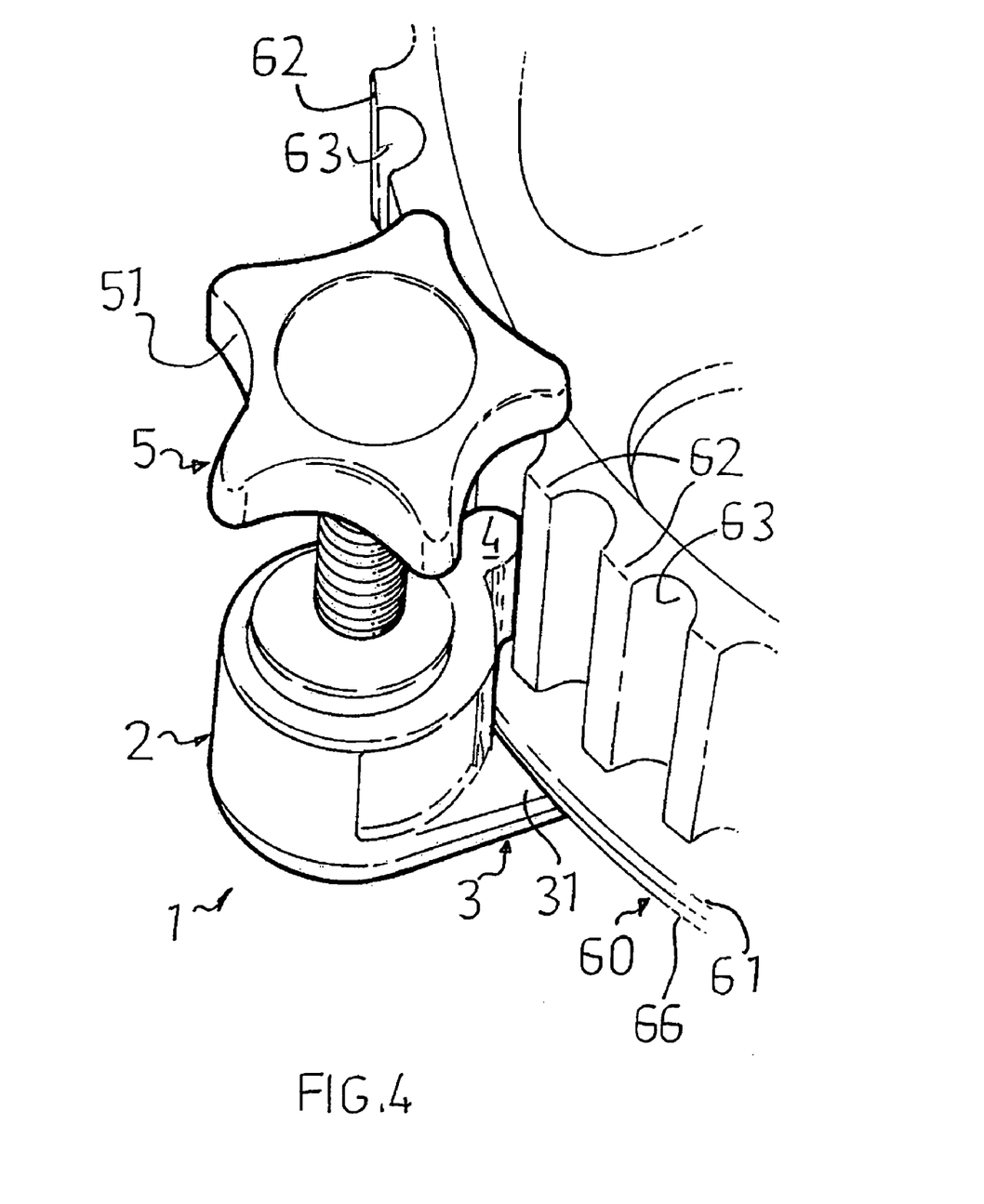
FIG. 4 is a perspective view of the holding device of FIG. 1, shown holding a flanged gear.
Figure 8:
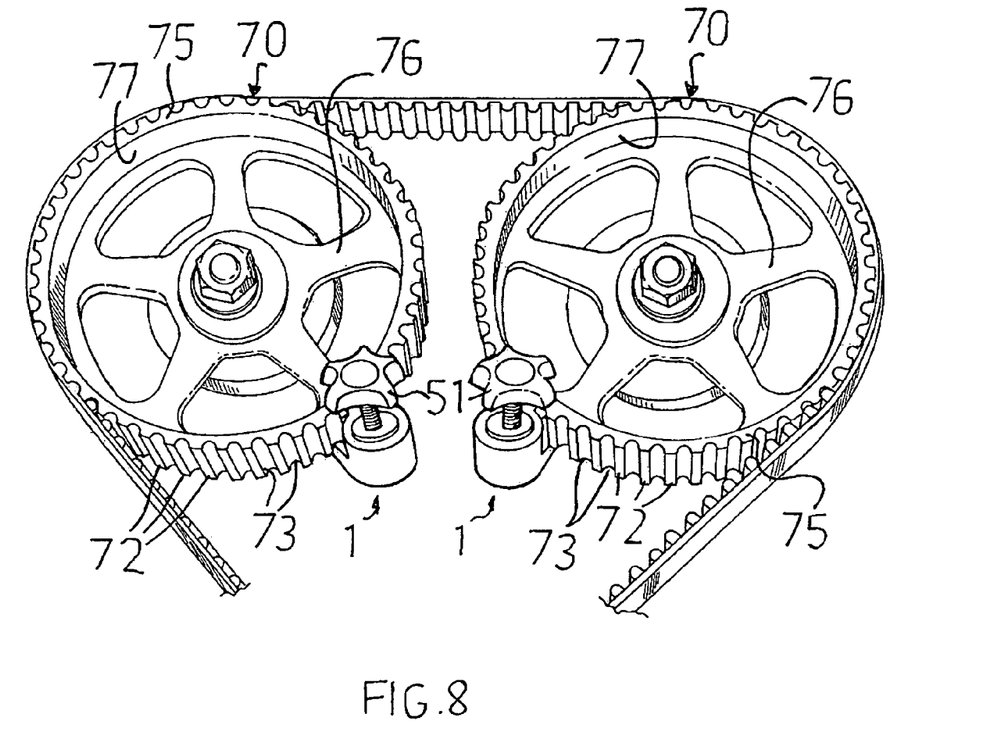
FIG. 8 shows how two holding devices as shown in FIG. 1 may be used to hold two cam gears of an engine stationary relative to another part of the engine.

The hooked portion 3 may engage different gears in different ways. As seen in FIGS. 4 and 5, the flanged gear 60 has a circumferentially extending flange 61, the flange plate 31 extends adjacent a lower face 66 of the flange 61, and the wall 32 extends adjacent an inner face 65 of the flange 61. The ends 33 of the wall 32 are in contact with the inner face 65. As seen in FIG. 8, the holding device 1 hooks behind a circumferentially extending toothed rim 75 of the gear 70, adjacent a hub 76 of the gear 70. The ends 33 of the wall 32 are in contact with an inner face 77 of the rim 75.

The projection 4 is substantially in the shape of a half cylinder and extends laterally of the body 2 above the flange plate 31. The projection 4 is adapted to extend within a recess 63, 73 between adjacent teeth 62, 72 of the gear 60, 70. The projection 4 has a diameter of about 4-8 mm.

The projection 4, hooked portion 3 and outer shell 23 are of unitary construction and are made of fibre reinforced synthetic polymer. Body insert 24 is made of metal.

The jacking screw 5 has a plastic knob 51 and a metal threaded shank 52 extending therefrom. An end 53 of the shank 52 is pointed. The shank 53 extends through the threaded passage and is rotatable relative to the body 2 using the knob 51.

Figure 9:
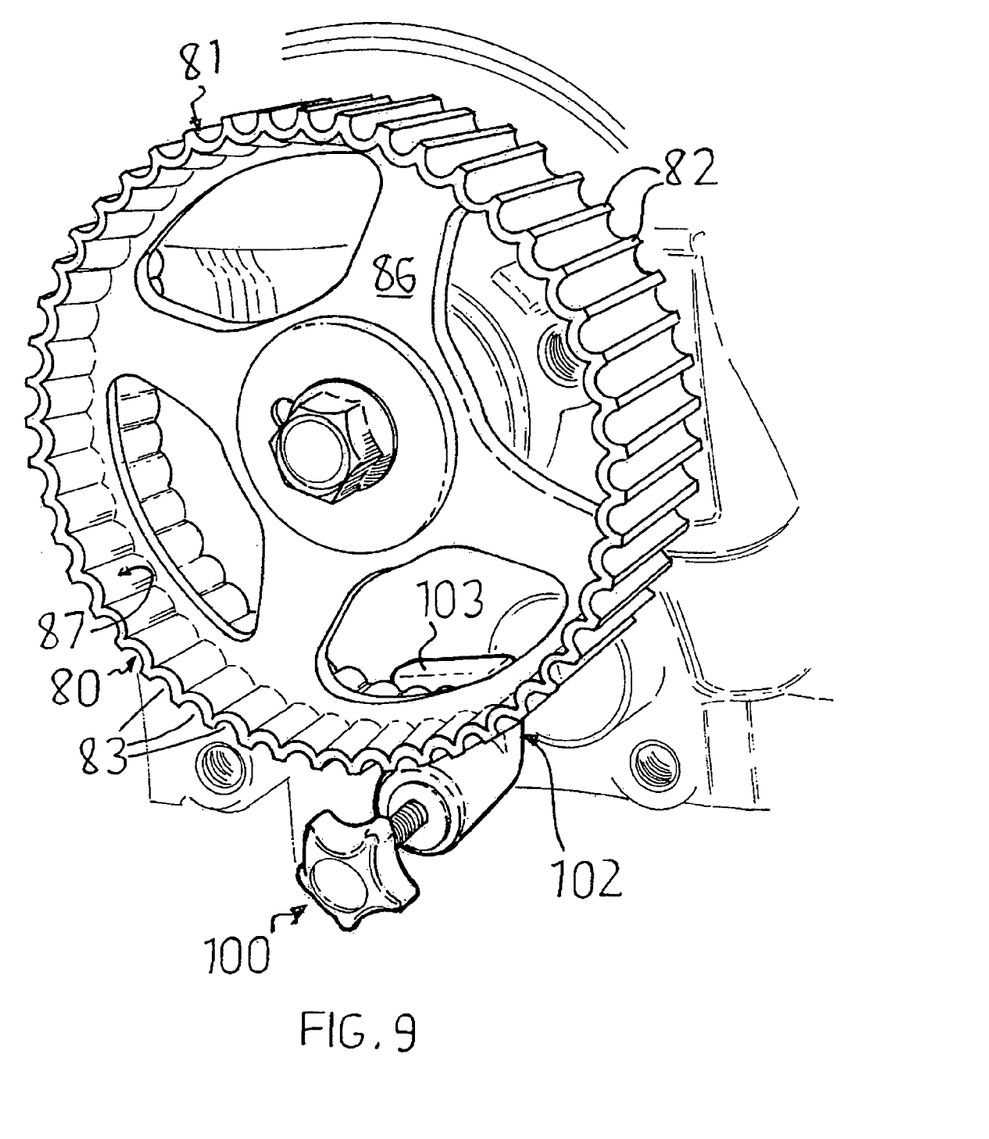
FIG. 9 is a perspective view of a holding device similar to that of FIG. 1, shown holding another type of gear relative to an engine block.

FIG. 9 shows a holding device 100 according to another embodiment of the invention. The device 100 is the same as device 1 except that the hooked portion 102 has an upstanding wall 103 that has a corrugated/undulating shape instead of being linear and having chamfered ends. The cam gear 80 has a hub 86 and a circumferentially extending toothed rim 81.

The wall 103 has a corrugated/undulating shape that closely matches the shape of an inner face 87 of the rim 81. Teeth 82 of the rim 81 and recesses 83 there between create the shape of the inner face 87.

In use, the holding device 1 (or 100) is positioned relative to a gear 60, 70 such that the hooked portion 3 extends between the gear 60, 70 and the engine block (or the cylinder head, as the case may be) and such that it hooks behind the teeth 62, 72. The jacking screw 5 is then rotated in a first direction using the knob 51 until the end 53 of the shank 52 is made to engage the engine block and until the flange plate 31 is brought into firm contact with the gear 60, 70—such that the gear 60, 70 is urged away from the engine block. Once the flange plate 31 is in firm contact with the gear 60, 70, the gear 60, 70 is firmly held relative to the engine block. In order to remove the holding device 1, the jacking screw 5 is rotated in the other direction relative to the block 2.

The advantages of the present invention include that it comprises only two moving parts and it is not tedious to use in confined spaces of engine bays. In order to hold a gear stationary relative to an engine block, all one need do is position the device correctly relative to the gear and the engine block, and then rotate the jacking screw.

Another advantage of the present invention as exemplified in FIGS. 1-8 is that the one device may be used to hold gears of differing diameter and tooth profiles. Typically, such gears will have a diameter of between about 100 to 150 mm.

The foregoing embodiments are illustrative only of the principles of the invention, and various modifications and changes will readily occur to those skilled in the art. The invention is capable of being practiced and carried out in various ways and in other embodiments. It is also to be understood that the terminology employed herein is for the purpose of description and should not be regarded as limiting.

The term "comprise" and variants of the term such as "comprises" or "comprising" are used herein to denote the inclusion of a stated integer or stated integers but not to exclude any other integer or any other integers, unless in the context or usage an exclusive interpretation of the term is required.

Any reference to a publication cited in this specification is not an admission that the disclosure constitutes common general knowledge.

The invention claimed is:

1. A gear holding device for holding a gear of an engine stationary relative to another part of the engine, said device comprising:

a body having an upper end and a lower end, and a threaded passage extending between the ends;

a projection extending laterally of the body and adapted to engage one or more teeth of the gear such that there is substantially no engagement of the body with the gear, wherein the projection is substantially in the shape of a half cylinder and a longitudinal axis of the cylinder extends parallel with an axis of the body;

a hooked portion extending from the lower end of the body and being immovable relative to the body when engaging the gear, wherein said hooked portion is adapted to (i) extend between the gear and the other part of the engine, and (ii) hook behind the teeth of the gear; and a jacking screw extending through the passage and rotatable relative to the body such that an end of the jacking screw engages the other part of the engine, wherein rotation of the jacking screw alone moves the hooked portion into engagement with the gear to hold the gear relative to the other part of the engine, wherein the body, the hooked portion and the projection are of unitary construction.

2. The gear holding device of claim 1, wherein the body is substantially cylindrical and the threaded passage extends along the axis of the body.

3. The gear holding device of claim 2, wherein the projection is adapted to extend within a recess between adjacent teeth of the gear.

4. The gear holding device of claim 1, wherein the body comprises an outer shell having a bore and an inner block having the threaded passage, and the block is removably insertable into the bore.

5. The gear holding device of claim 1, wherein the hooked portion comprises a flange extending perpendicularly of the body and an upturned end for hooking behind the teeth.

6. The gear holding device of claim 5, wherein the flange is a plate and the upturned end is an upstanding wall extending along a width of the plate.

7. The gear holding device of claim 6, wherein each end of the wall is chamfered.

8. The gear holding device of claim 1, wherein the jacking screw comprises a knob and a threaded shank extending therefrom, and an end of the shank in contact with the other part of the engine is pointed.

9. The gear holding device of claim 1, wherein the gear has a diameter of between 100 mm and 150 mm.

10. A method for holding a gear of an engine stationary relative to another part of the engine using a gear holding device according to claim 1,
wherein steps of the method consist of:
(1) situating the gear holding device according to claim 1 such that the projection engages said one or more teeth of the gear, and the hooked portion both (i) extends between the gear and the other part of the engine, and (ii) hooks behind the teeth of the gear; and
(2) rotating the jacking screw to, in a single action, both move the hooked portion into engagement with the gear and to hold the gear relative to the other part of the engine.

* * * * *